United States Patent [19]

Runeric

[11] 4,411,089
[45] Oct. 25, 1983

[54] FISHING FLY WITH SYNTHETIC FEATHER

[76] Inventor: Ronald A. Runeric, 113 W. Moreland Ter., Akron, Ohio 44302

[21] Appl. No.: 387,947

[22] Filed: Jun. 14, 1982

Related U.S. Application Data

[63] Continuation of Ser. No. 271,530, Jun. 8, 1981, abandoned.

[51] Int. Cl.³ .............................................. A01K 85/08
[52] U.S. Cl. .................................... 43/42.53; 43/42.25
[58] Field of Search ............................. 43/42.25, 42.53

[56] References Cited

U.S. PATENT DOCUMENTS

| | | | |
|---|---|---|---|
| 1,640,599 | 8/1927 | Conn .............................. | 43/42.25 X |
| 1,930,121 | 10/1933 | Billstein .............................. | 428/6 X |
| 2,093,585 | 9/1937 | Woodhead et al. ............... | 43/42.25 |
| 2,121,072 | 6/1938 | Deans ................................... | 43/42.25 |
| 3,864,864 | 2/1975 | Duescher ........................... | 43/42.25 |
| 4,259,400 | 3/1981 | Bolliand ............................. | 428/6 X |

Primary Examiner—Nicholas P. Godici
Assistant Examiner—Charles L. Willis
Attorney, Agent, or Firm—Harpman & Harpman

[57] ABSTRACT

A fishing fly uses a synthetic feather in the tying thereof, which feather comprises a plurality of unidirectional synthetic fiber filaments bonded to a synthetic thread by an adhesive compound forming a relatively uniform fly feather that is wrapped around the shank of a hook in the fishing fly.

7 Claims, 4 Drawing Figures

FISHING FLY WITH SYNTHETIC FEATHER

This is a continuation of application Ser. No. 271,530, filed June 8, 1981, now abandoned.

BACKGROUND OF THE INVENTION (1) Field of the Invention

The invention relates to fishing flies and feathers used in the tying of fishing flys which heretofore which were natural neck feathers from chickens.

(2) Description of the Prior Art

No prior art synthetic feathers of the type and quality required for fishing flys are known. The artificial feathers currently produced cannot be used on fishing flies successfully.

An example of such can be seen in U.S. Pat. No. 3,922,401.

In U.S. Pat. No. 3,922,401 an imitation feather fletching is disclosed wherein the fletching is produced from a length of synthetic resin sheet material.

Applicant's device uses a parallel row of synthetic fibers onto which is secured a single thread at right angles thereto. The fibers are bent around the thread forming a high concentration of fibers on one side thereof.

SUMMARY OF THE INVENTION

A fishing fly has a synthetic fly feather that is used in tying the fishing fly and has a plurality of synthetic fiber elements bonded at right angles to a synthetic flat thread and a shank of the fishing fly. The fibers are bent around the thread to form a uniform mass that can be colored to resemble natural feathers. The synthetic feather is applied to a fishing fly in the same manner as natural feathers and has similar performance characteristics.

DESCRIPTION OF THE PREFERRED EMBODIMENT

Figure 1:
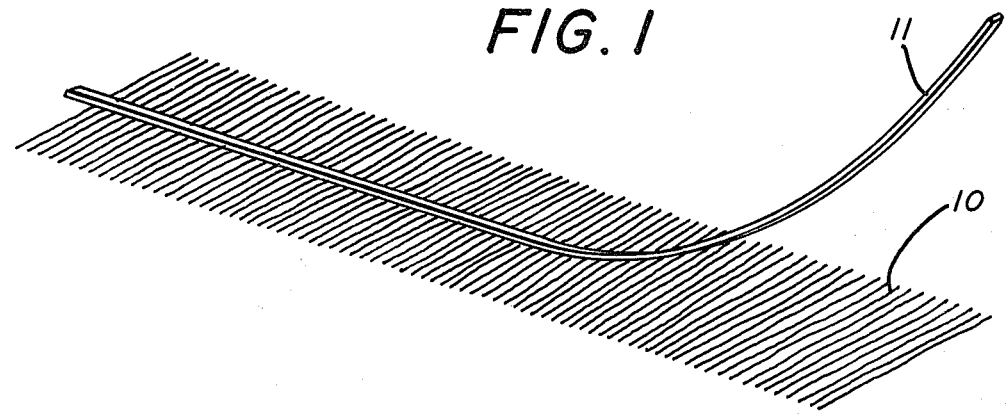
FIG. 1 is a perspective view of the partially assembled parts used in making a synthetic feather.
Figure 2:
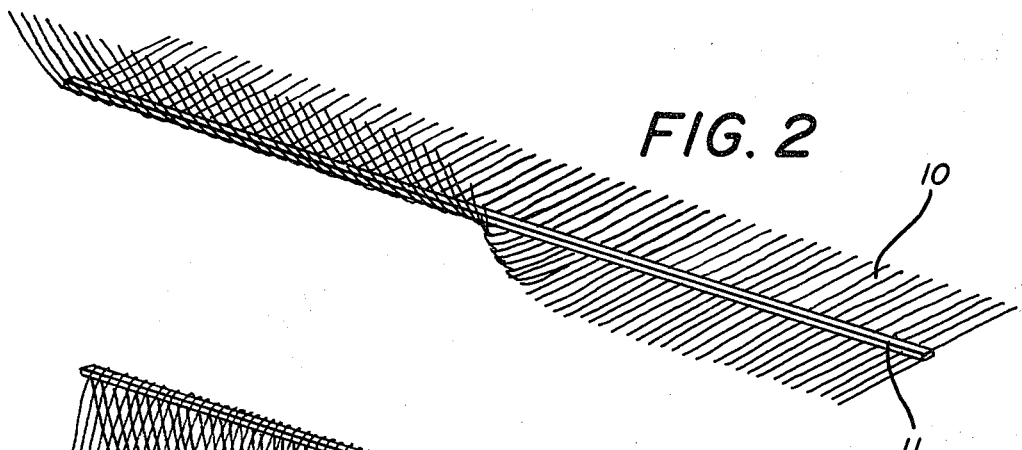
FIG. 2 is a perspective view of the partially completed synthetic feather.
Figure 3:
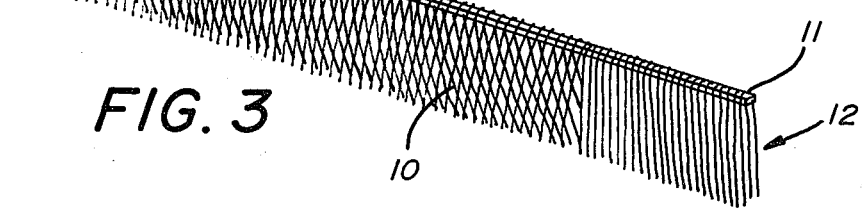
FIG. 3 is a perspective view of an inverted feather, a portion of which is finished.

Referring now to FIGS. 1, 2 and 3 of the drawings, a plurality of synthetic filaments 10 are aligned in spaced parallel relation to one another in a row. The synthetic filaments 10 can be anyone of a number of different filaments, for example nylon, of round, flat or other cross section a superpolymeric amide of protein-like structure. The filaments 10 are bonded to a first thread 11. The thread 11 is formed of synthetic base material such as polyethylene terephthalates, a fiber forming polymer. The thread 11 has a width greater than its height. An adhesive is applied on the underside of the flat thread 11 adjacent the filaments 10. The adhesive can be anyone of a group capable of bonding the flat thread 11 to the filament such as an epoxy resin polymer.

The epoxy resin polymer is derived from epichlorhydrin and bisphenol-A. Alternately the thread 11 can be heat sealed to the filaments 10. The adhesive coated thread 11 is centered along the horizontal axis of the row of filaments 10 at right angles thereto as best seen in FIG. 1 of the drawings. The filaments 10 attached to the flat thread 11 are folded upwardly around the flat thread 11 in a V-shaped arrangement as shown in FIG. 2 of the drawings. This arrangement locates all of the filaments 10 on one side of the flat thread 11.

Referring now to FIG. 3 of the drawings, the flat first thread 11 carrying the filaments 10 is inverted and a secondary adhesive is applied longitudinally thereof. The secondary adhesive can be any one of a number of adhesives available such as an air dry or thermal set type. The attached filaments 10 on one side of the flat thread 11 form a relatively thick concentration which can be partially colored to enhance the appearance of the finished fly. The completed synthetic feather 12 is shown at the right end of FIG. 3 and it is used on the main body of a fishing fly 13 seen in FIG. 4 of the drawing. The fishing fly consists of a shank 14 having a hook 15 with a barb 16 on one end thereof. The opposite end of the shank 14 has an eyelet 7. A second thread 18 is tied to the shank 14 adjacent the eyelet 7 and is wrapped around the shank 14 securing a longitudinally extending multiple filament tail portion 19 and a radially extending wing portion 20 thereto.

Figure 4:
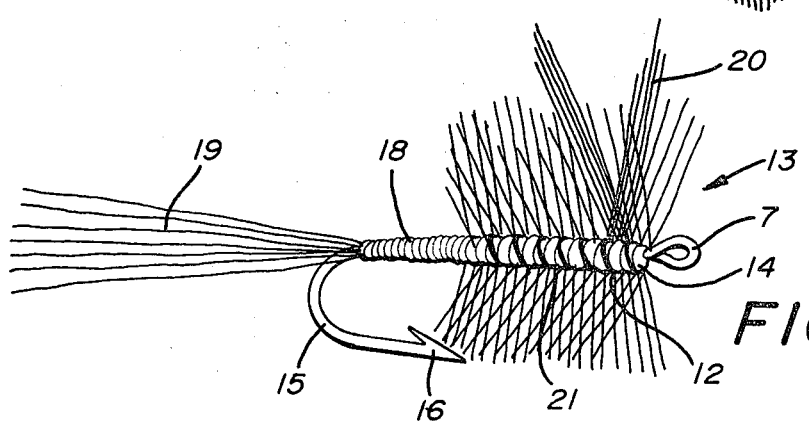
FIG. 4 is a perspective view of a fishing fly showing the synthetic feather wrapped thereon.

The body of the fly 13 is formed by winding a third thread 21 on a portion of the shank 14 so as to thicken the body of the fly. The synthetic feather 12 is then wrapped in a spiral pattern over and around the thickened body of the fly 13 as seen in FIG. 4 of the drawings.

In use the synthetic feather 12 holds the fishing fly on the surface of the water in a realistic and life-like manner. A major advantage of the synthetic feather 12 is that its performance on a fishing fly closely approaches that of a natural chicken neck feather normally used. The synthetic feather 12 can be produced a low cost and of uniform quality.

The fishing fly with its synthetic feather disclosed herein makes it possible to produce highly desirable fishing flys with the desired characteristics of the chicken neck natural feathers heretofore used.

Although but one embodiment of the present invention has been illustrated and described, it will be apparent to those skilled in the art that various changes and modifications may be made herein without departing from the spirit of the invention and having thus described my invention

What I claim is:

1. The method of making a fishing fly incorporating a hook having a shank, a tail portion, a wing portion and a feather wherein said feather is formed of a plurality of synthetic filaments arranged in spaced parallel relation and fastened in a row to a first thread, folding said filaments around said first thread to position said filaments on one side thereof, wrapping said first thread spirally around the shank of said hook so that said filaments extend radially from said shank.

2. The method of making a fishing fly set forth in claim 1 and wherein said filaments are of uniform length.

3. The method of making a fishing fly set forth in claim 1 and wherein said filaments are fastened to said first thread by heat sealing.

4. The method of making a fishing fly set forth in claim 1 wherein said filaments are fastened to said first thread by an adhesive.

5. The method of making a fishing fly set forth in claim 1 wherein said first thread is flat and is formed of a synthetic resin base material and is of a width substantially greater than its height.

6. The method of making a fishing fly set forth in claim 1 wherein the synthetic filaments are cross sectionally round.

7. The method of making a fishing fly set forth in claim 1 and wherein said synthetic filaments are cross sectionally flat.

* * * * *